United States Patent
Tsirkin et al.

(10) Patent No.: US 11,870,846 B2
(45) Date of Patent: Jan. 9, 2024

(54) POST-COPY MIGRATION CROSS CLUSTER SYNCHRONIZATION FOR POST-COPY MIGRATION OF VIRTUAL MACHINES

(71) Applicant: Red Hat, Inc., Raleigh, NC (US)

(72) Inventors: Michael Tsirkin, Yokneam Illit (IL); David Alan Gilbert, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/185,628

(22) Filed: Feb. 25, 2021

(65) Prior Publication Data

US 2022/0272152 A1  Aug. 25, 2022

(51) Int. Cl.
H04L 67/1095 (2022.01)
G06F 9/455 (2018.01)
G06F 3/06 (2006.01)
H04L 9/06 (2006.01)

(52) U.S. Cl.
CPC ......... *H04L 67/1095* (2013.01); *G06F 3/067* (2013.01); *G06F 3/0608* (2013.01); *G06F 3/0641* (2013.01); *G06F 3/0644* (2013.01); *G06F 9/45558* (2013.01); *H04L 9/0643* (2013.01); *G06F 2009/4557* (2013.01)

(58) Field of Classification Search
CPC . H04L 67/1095; H04L 9/0643; G06F 3/0608; G06F 3/0641; G06F 3/0644; G06F 3/067; G06F 9/45558; G06F 2009/4557
See application file for complete search history.

(56) References Cited

U.S. PATENT DOCUMENTS

| | | |
|---|---|---|
| 8,327,060 B2 | 12/2012 | Heim |
| 9,116,803 B1 | 8/2015 | Agrawal |
| 9,590,917 B2 | 3/2017 | Karunamoorthy |
| 9,720,724 B2 | 8/2017 | Agrawal |
| 9,823,842 B2 | 11/2017 | Gopalan et al. |
| 9,880,872 B2 | 1/2018 | Srinivas |
| 10,057,636 B1* | 8/2018 | Nijim ................. H04N 21/4325 |
| 10,432,727 B1 | 10/2019 | Singh |
| 10,579,409 B2 | 3/2020 | Beveridge |
| 11,256,534 B2* | 2/2022 | Naenko ............... G06F 9/45545 |

(Continued)

FOREIGN PATENT DOCUMENTS

CN  105577727 A  5/2016

OTHER PUBLICATIONS

Hines et al, "Post-Copy Live Migration of Virtual Machines", Computer Science, Binghamton University (SUNY), Jul. 2009, 14 pages https://www.researchgate.net/publication/220624148_Post-copy_live_migration_of_virtual_machines/link/00b7d53718d83608ef000000/download.

(Continued)

*Primary Examiner* — Michael A Keller
(74) *Attorney, Agent, or Firm* — Lowenstein Sandler LLP (57) ABSTRACT

Systems and methods of the disclosure include: publishing, by a first host computer system of a computing cluster comprising a plurality of host computer systems running a plurality of virtual machines, a list of memory page identifiers, wherein each memory page identifier is associated with a corresponding content identifier; receiving, from a second host computer system of the computing cluster, a memory page request comprising a first memory page identifier; and sending, to the first host computer system, a first memory page identified by the first memory page identifier.

20 Claims, 4 Drawing Sheets

(56) References Cited

U.S. PATENT DOCUMENTS

| | | | | |
|---|---|---|---|---|
| 2016/0077972 | A1* | 3/2016 | Pease | G06F 12/0804 |
| | | | | 711/141 |
| 2017/0003997 | A1 | 1/2017 | Kelly | |
| 2017/0147240 | A1* | 5/2017 | Tsirkin | G06F 3/0619 |
| 2017/0147518 | A1* | 5/2017 | Gordon | G06F 13/00 |
| 2018/0316502 | A1* | 11/2018 | Nadeau | H04L 9/0637 |
| 2019/0065756 | A1* | 2/2019 | Tsirkin | G06F 12/145 |
| 2019/0303541 | A1* | 10/2019 | Reddy | G06F 21/64 |
| 2021/0004334 | A1* | 1/2021 | Tian | G06F 12/1036 |
| 2022/0138640 | A1* | 5/2022 | Augustine | G06F 21/16 |
| | | | | 705/5 |
| 2022/0207818 | A1* | 6/2022 | Allen | G06T 15/20 |

OTHER PUBLICATIONS

Deshpande et al., "Live Gang Migration of Virtual Machines", Computer Science, Binghamton University, Jun. 3-11, 2011, 12 pages https://kartikgopalan.github.io/publications/deshpande11live.pdf.

Riteau et al., "Shrinker: Improving Live Migration of Virtual Clusters over WANs with Distributed Data Deduplication and Content-Based Addressing", Universit'e de Rennes 1, IRISA, Rennes, France; INRIA, Centre INRIA Rennes—Bretagne Atlantique, France, Jun. 15, 2011, 13 pages https://hal.inria.fr/inria-00600707/document.

Noshy et al., "Optimization of Live Virtual Machine Migration in Cloud Computing: A Survey and Future Directions", Computer Engineering and Systems Dept., Faculty of Engineering, Mansoura University, Egypt, Mar. 2018, 11 pages https://www.researchgate.net/publication/323673161_Optimization_of_live_virtual_machine_migration_in_cloud_computing_A_survey_and_future_directions.

Moltó et al., "A Generic Catalog and Repository Service for Virtual Machine Images", Instituto de Instrumentaci' on para Imagen Molecular, Universidad Polit'ecnica de Valencia, Spain, Jan. 2010, 16 pages https://www.researchgate.net/publication/233906883_A_Generic_Catalog_and_Repository_Service_for_Virtual_Machine_Images.

* cited by examiner

POST-COPY MIGRATION CROSS CLUSTER SYNCHRONIZATION FOR POST-COPY MIGRATION OF VIRTUAL MACHINES

TECHNICAL FIELD

The implementations of the disclosure generally relate to virtualization systems and, more specifically, to systems and methods for post-copy migration cross cluster synchronization for post-copy migration of virtual machines.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on. A VM may have a virtual processor, virtual system memory, virtual storage, and various virtual devices. VMs may be migrated between a source host computing platform ("the source host") and a destination host computing platform ("the destination host") connected over a network, which may be a local-area network (LAN) or a wide-area network (WAN) that may include the Internet.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are systems and methods for post-copy migration cross cluster synchronization for post-copy migration of virtual machines.

One approach for migration of a VM from a source host computer system to a destination host computer system over a network is to permit a VM running on the source host to continue to run during the migration process, which is referred to as live migration. Live migration typically permits a running VM to be moved between different host computer systems transparently for application programs running on the VM and for their respective clients. For successful live migration, VM memory, processor state, and network connectivity should be migrated from the source host to the destination host.

Methods of live migration may include "pre-copy" and "post-copy" techniques. Pre-copy techniques can involve sending a copy of the state of a VM to the destination host while the VM continues to execute on the source host. If some memory pages change during the process, they can be re-copied until there are very few changes remaining on the source, at which point the VM can be stopped on the source and restarted on the destination. Post-copy techniques can involve suspending the VM on the source, copying a subset of the state of the VM to the destination, and then resuming the VM on the destination. If a post-copied VM attempts to access a page of its own memory that has not been migrated, the attempted access can generate a fault and the requesting VM can stop executing until the memory is retrieved from the source host.

Employing post-copy techniques can provide many advantages over pre-copy techniques for live migration. In particular, pre-copy live migration of VMs that utilize a large amount of memory can be very time-consuming since the VM may continue modifying memory on the source host which then needs to be copied to the destination host prior to starting the VM on the destination host. With post-copy live migration, the VM may be started on the destination host despite some of the memory associated with the VM still residing on the source host.

Post-copy live migration, however, can present challenges to completing live migration successfully. Post-copy live migration of a VM that utilizes a large amount of memory can often fail to complete successfully in instances where the source host has insufficient resources to support the transfer of all of the memory used by the migrating VM. In some instances during the migration process, source host resources may be utilized by other processors, thereby reducing resources available to the migrating VM. In such cases, migrating the VM to the destination host may fail and/or be inefficient because the source host is slow to send a memory page to the destination host. One solution to this problem may be to increase network speed in order to obtain a faster VM migration. However, this solution may be very expensive or impossible to implement.

Aspects of the present disclosure address the above and other deficiencies by providing systems and methods for post-copy migration speedup by cross cluster synchronization for virtual machines. Implementations of the present disclosure exploit the full-duplex nature of the communication networks interconnecting host computer systems running virtual machines within a computing cluster. "Computing cluster" herein refers to a cluster of host computer systems, each running one or more virtual machines. Accordingly, migrating a virtual machine from a source host to a destination host using post-copy live migration techniques may involve, in addition to transmitting virtual memory pages from the source host to the destination host, also determining whether one or more hosts (other than the source host) located within the computing cluster hold a copy of a memory page that the destination host needs for the virtual machine and retrieving the memory page from one of the identified hosts, thus effectively reducing network load on the source host during the VM migration.

Thus, by retrieving at least some memory pages from the hosts that are different from the source host, implementations of the present disclosure may significantly improve the efficiency of post-copy live migrations, particularly since the destination host no longer needs to wait until the source host is available to send a memory page to the destination host. Various aspects of the above referenced methods and systems are described in details herein below by way of examples, rather than by way of limitation. The examples provided below discuss a virtualized computer system where post-copy migration cross cluster synchronization for post-copy migration of virtual machines may be initiated by aspects of a hypervisor, a host operating system, a virtual machine, or a combination thereof. In other examples, the post-copy migration speedup by cross cluster synchronization may be performed in a non-virtualized computer system that is absent a hypervisor or other virtualization features discussed below.

Figure 1:
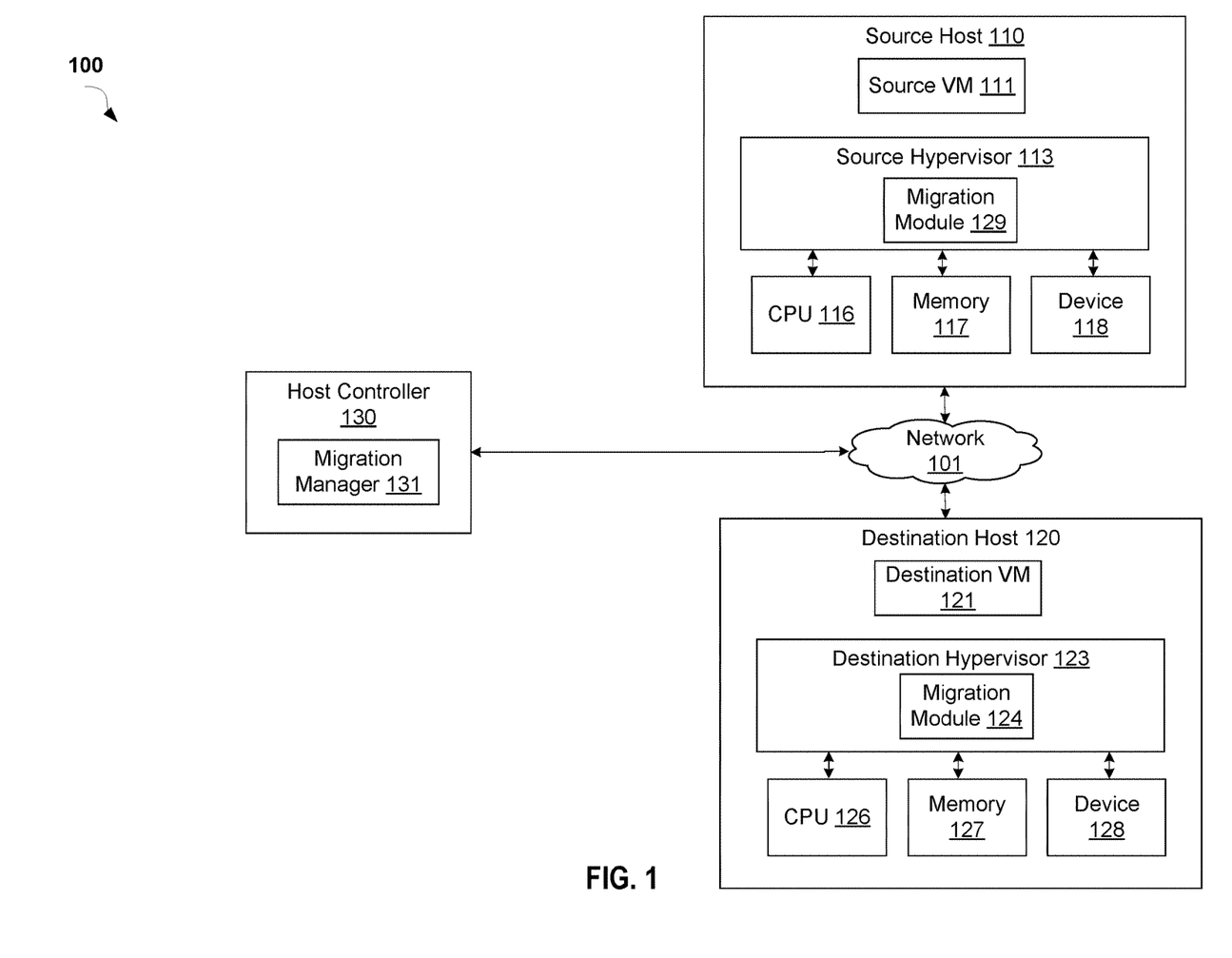
FIG. 1 is a block diagram of a network architecture 100 in accordance with one or more aspects of the present disclosure.

FIG. 1 is a block diagram of a network architecture 100 in which implementations of the disclosure may operate. Although implementations of the disclosure are described in accordance with a certain type of system, this should not be considered as limiting the scope or usefulness of the features of the disclosure.

As shown in FIG. 1, the network architecture 100 includes one or more source hosts 110 coupled to one or more destination hosts 120 over a network 101. The network 101 may be a private network (e.g., a local area network (LAN), wide area network (WAN), intranet, etc.) or a public network (e.g., the Internet). The source hosts 110 and destination hosts 120 may also be coupled to a host controller 130 (via the same or a different network or directly). Host controller 130 may be an independent machine such as a server computer, a desktop computer, etc. Alternatively, the host controller 130 may be part of the source host 110 or destination host 120. The one or more source hosts 110 and the one or more destination hosts 120 may be within a computing cluster.

Host controller 130 can manage the source VMs 111 and destination VMs 121. Host controller 130 may manage the allocation of resources from source host 110 to source VMs 111 and the allocation of resources from destination host 120 to destination VMs 121. In addition, host controller 130 may initiate the migration of source VM 111 with its associated memory to destination VM 121 of destination host 120. In some implementations, host controller 130 may run on a separate physical machine from source host 110 and destination host 120. Alternatively, host controller 130 may run locally on either source host 110 or destination host 120. The host controller 130 may include a migration manager 131 to initiate the migration of source VM 111 to destination VM 121.

Source host 110 may include server computers or any other computing devices capable of running one or more source virtual machines (VMs) 111. Each source VM 111 can be a software implementation of a machine that executes programs as though it was a physical machine. Each source VM 111 may run a guest operating system (OS) that may be different from one virtual machine to another. The guest OS may include Microsoft Windows, Linux, Solaris, Mac OS, etc.

The source host 110 may additionally include a source hypervisor 113 that emulates the underlying hardware platform for the source VMs 111. The source hypervisor 113 may also be known as a virtual machine monitor (VMM) or a kernel-based hypervisor. Source hypervisor 113 can manage the source-side tasks required for migration of a source VM 111 that is running on source host 110 to a destination host 120. The source hypervisor 113 can monitor the status of the migration state of each source VM 111 during migration, migrate memory pages from memory 117 to destination host 120, and service requests received from destination host 120 for missing shared memory pages.

In some implementations, source host 110 may additionally include one or more physical central processing units (CPUs) 116 (referred to herein as "processors" or "processing devices") communicatively coupled to memory device 117, and one or more devices 118 (e.g., network interface controller (NICs), graphics cards, etc.). "CPU," "processor," or "processing device" herein shall refer to a device capable of executing instructions encoding arithmetic, logical, or I/O operations. In an illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor, which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). "Memory device" herein shall refer to a volatile or non-volatile memory device, such as random access memory (RAM), read only memory (ROM), electrically erasable programmable read-only memory (EEPROM), or any other device capable of storing data. "Network interface controller" herein shall refer to a device capable of implementing a physical layer and data link layer standard (such as Ethernet or InfiniBand).

Destination host 120 may include server computers or any other computing devices capable of running one or more destination VMs 121. Each destination VM 121 can be a software implementation of a machine that executes programs as though it was a physical machine. Each destination VM 121 may run a guest operating system (OS) that may be different from one virtual machine to another. The guest OS may include Microsoft Windows, Linux, Solaris, Mac OS, etc.

The destination host 120 may additionally include a destination hypervisor 123 that emulates the underlying hardware platform for the destination VMs 121. The destination hypervisor 123 may also be known as a virtual machine monitor (VMM) or a kernel-based hypervisor. In some implementations, destination host 120 may include one or more physical CPUs 126 (referred to herein as "processors" or "processing devices") communicatively coupled to memory device 127, and one or more devices 128 (e.g., NICs, graphics cards, etc.).

The source hypervisor 113 and the destination hypervisor 123 may include respective migration modules 129, 124 that implement post-copy migration of virtual machines by cross-cluster synchronization. In some implementations, the source hypervisor may maintain a list of its virtual machine pages that are also hosted by other hosts. For each memory page, the list may include its identifier (such as the guest physical address (GPA) of the page within the virtual machine's physical address space), its content identifier (such as a value of a cryptographic hash of the content of the memory page), and one or more host identifiers of the hosts that have copies of this memory page.

In order to avoid computing hashes of all memory pages (which may be cost-prohibitive in terms of the computing resources consumed by such computation), each host of the cluster may only compute the hashes of memory pages that are shared by two or more virtual machines running on the host, under the assumption that virtual machines sharing the identified memory pages can also run on other hosts. Such memory pages may be identified by the kernel memory deduplication process running on the host, such as the Kernel Samepage Merging (KSM) daemon, which periodically scans the host memory areas storing virtual machine pages in order to identify memory pages having identical content; each set of identified identical pages may be replaced by a single write-protected page (which is automatically copied-on-write if a virtual machine later wants to update its content). Since the identified shared memory pages are present in the host memory, computing the hashes of such pages would not be a computationally expensive operation.

Thus, each host of the cluster publishes a list of the identified memory pages that are shared by two or more virtual machines running on the host. For each memory page, the list may include its identifier (such as the guest physical address (GPA) of the page within the virtual machine's physical address space) and its content identifier (such as a value of a cryptographic hash of the content of the memory page). As noted herein above, the source hypervisor may receive all the published lists from other hosts and compile a list of its virtual machine pages that are also hosted by other hosts. For each memory page to be included into the list, the source hypervisor may compare its content identifier (e.g., a cryptographic hash of its content) with the content identifier of a candidate memory page hosted on another host, to make sure that the two memory pages not only share their identifiers (e.g., the GPA), but also their content identifiers match. Thus, responsive to receiving a request from the destination hypervisor for a particular memory page (which can be identified by its GPA), the source hypervisor may, instead of sending the requested page, respond to the destination hypervisor with identifiers of one or more other hosts that have the requested page. Upon receiving such a response, the destination hypervisor may request the page from one of the identified hosts.

Figure 2:
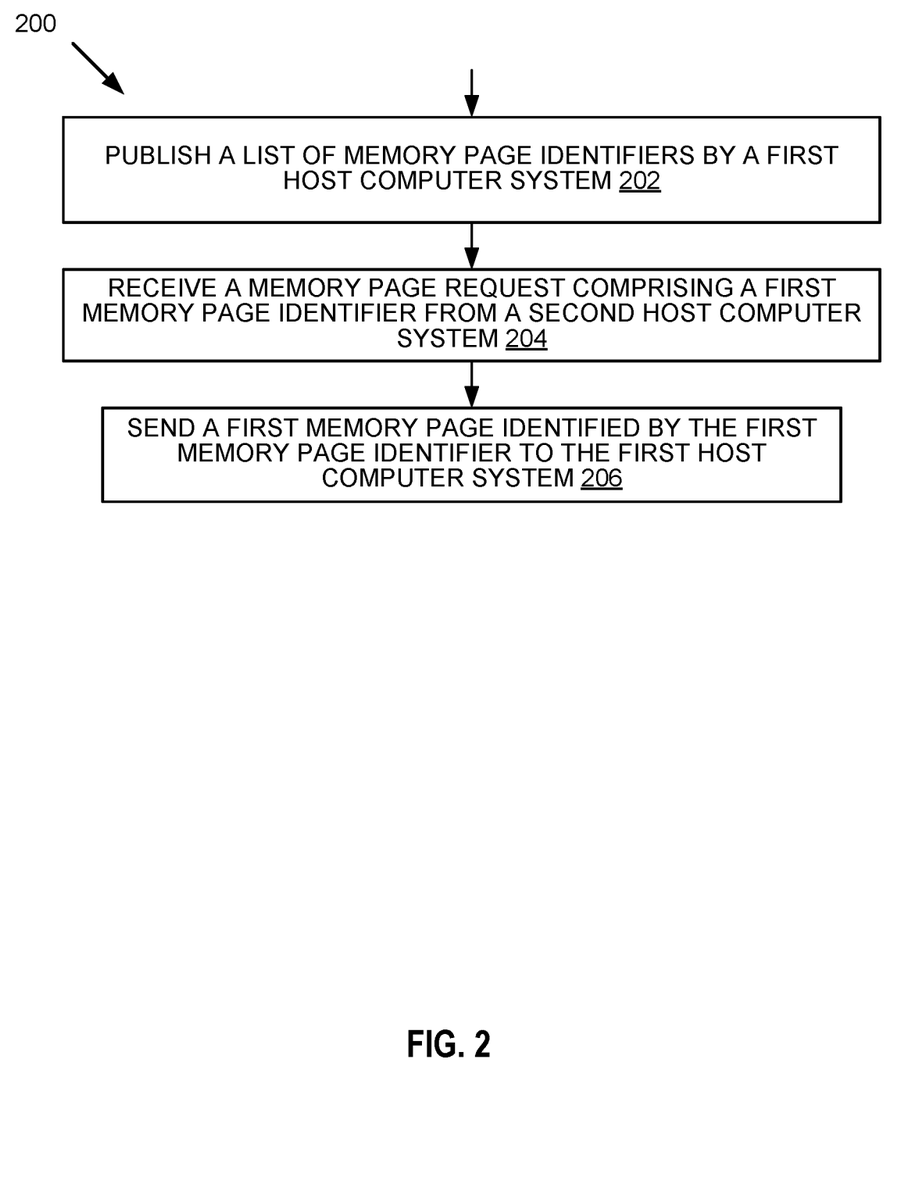
FIG. 2 is a flow diagram illustrating an implementation of a method executed by a host module (e.g., a hypervisor) for post-copy migration cross cluster synchronization for post-copy migration of virtual machines in accordance with one or more aspects of the present disclosure.

FIG. 2 is a flow diagram illustrating an example method 200 for post-copy migration cross cluster synchronization for post-copy migration of virtual machines operating in accordance with one or more aspects of the present disclosure. Method 200 may be performed by processing logic (e.g., in computer system 400 of FIG. 4) that may comprise hardware (e.g., circuitry, dedicated logic, programmable logic, microcode, etc.), software (such as instructions run on a processing device), firmware, or a combination thereof.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 2, in one embodiment, method 200 begins at block 202 when the first host computer system publishes a list of memory page identifiers. The first host computer system may be part of a computing cluster. Each memory page identifier may be, e.g., the guest physical address (GPA) of a memory page within a virtual machine's physical address space. Each memory page identifier may be associated with a corresponding content identifier. The content identifier may be, e.g., a value of a cryptographic hash of the content of a memory page corresponding with each memory page identifier. "Hash" herein refers to a value of an irreversible function mapping a sequence of bytes (e.g., a memory page) to a bit sequence of a pre-determined size, such that two different input sequences are unlikely to produce the same hash value. The list of memory page identifiers may also include one or more host identifiers of the hosts of the computing cluster that have copies of the memory page. In an illustrative example, publishing the list of memory page identifiers may include storing the memory page identifiers and content identifiers in a centralized server associated with the computing cluster. The centralized server may be accessible to all hosts within the computing cluster. In another illustrative example, publishing the list of memory page identifiers may include storing the memory page identifiers and content identifiers in a shared memory region located on a virtual machine on which the memory page associated with the memory page identifier is located. The shared memory region may be accessible to the one or more virtual machines within the computing cluster.

In some implementations, in order to avoid computing hashes of all memory pages on all virtual machines hosted by host computer systems of the computing cluster, each host computer system of the computing cluster may only compute the hashes of memory pages that are shared by two or more virtual machines running on the host computer system. Such memory pages may be identified by the kernel memory deduplication process running on each host computer system, such as the Kernel Samepage Merging (KSM) daemon, which periodically scans the host memory areas storing virtual machine pages in order to identify memory pages having identical content; each set of identified identical pages may be replaced by a single write-protected page (which is automatically copied-on-write if a virtual machine later wants to update its content). In another implementation, one or more memory pages that are shared by at least one virtual machine hosted by the first host computer system and at least one virtual machine disk image may be identified by the kernel memory deduplication process running on each host computer system. Each host computer system may then publish a list of memory page identifiers.

In some embodiments, publishing the list of memory page identifiers may further include sending the list of the memory page identifiers to a third host computer system of the computing cluster. The third host computer system may host a virtual machine that is being migrated to one or more computing systems of the computing cluster. The third host computer system (e.g., the source host computer system) may receive all the published lists from the other host computers systems. The third host computer system may then compile a list of its virtual machine memory pages that are also hosted by other hosts. For each memory page to be included into the list, the first host computer system may iteratively compare its content identifier (e.g., a cryptographic hash of its content) with the content identifier of a memory page hosted on another host to make sure that the two memory pages not only share their identifiers (e.g., the GPA), but also their content identifiers match.

At block 204, the first host computer system may receive, from a second host computer system of the computing cluster, a memory page request. The memory page request may comprise a first memory page identifier. The first memory page identifier may be, e.g., the guest physical address (GPA) of a memory page within a virtual machine's physical address space. The first memory page identifier may also be associated with a content identifier, e.g., a value of a cryptographic hash of the content of the memory page associated with each memory page identifier.

At block 206, a first memory page identified by the first memory page identifier may be sent to the first host computer system. In some implementations, the first host computer system may retrieve the first memory page from one or more hosts within the computing cluster. In some implementations, sending the first memory page may further include determining that a first content identifier of the first memory page matches a second content identifier comprised by the memory page request.

Figure 3:
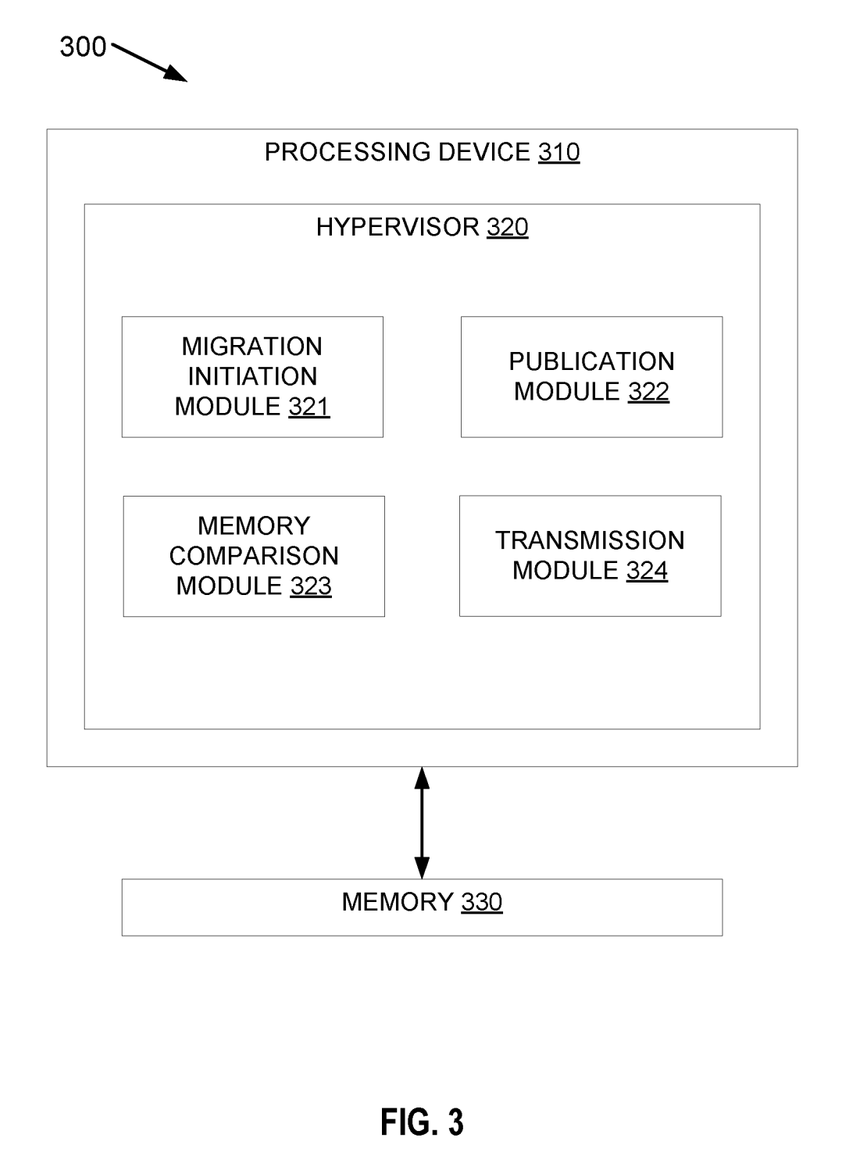
FIG. 3 is a block diagram example of a computer system operating in accordance with one or more aspects of the present disclosure.

FIG. 3 is a block diagram example of a computer system 300 operating in accordance with one or more aspects of the present disclosure. Computer system 300 may be the same or similar to the source host computer system 110 and the destination host computer system 120 of FIG. 1 and may include one or more processing devices and one or more memory devices. In the example shown, computer system 300 may include migration initiation module 321, publication module 322, memory comparison module 323, and transmission module 324. Alternatively, the functionality of one or more of migration initiation module 321, publication module 322, memory comparison module 323, and transmission module 324 may be combined into a single module or divided into multiple sub-modules.

Migration initiation module 321 is responsible for initiating the live migration of a VM from a source host computer system to a destination host computer system. In an illustrative example, migration initiation module 321 may initiate live migration in response to a triggering event such as a migration request received via a graphical user interface (GUI) or an application programming interface (API). The GUI or API may reside on the destination hypervisor. In another illustrative example, the migration request may be received in response to detecting a triggering condition, e.g., resource utilization by the source host computer system exceeding a threshold.

Publication module 322 is responsible for identifying one or more virtual memory pages that are shared between one or more hosts within the computing cluster. Identifying the one or more virtual memory pages that are shared between one or more hosts within the computing cluster may be done by utilizing a kernel same-page merging (KSM) feature associated with the one or more virtual machines. Publication module 322 is further responsible for calculating and publishing a content identifier and a memory page identifier associated with each shared virtual memory page. In an illustrative example, publishing the content identifier and the memory page identifier may include storing the content identifier and memory page identifier in a centralized server associated with the computing cluster. The centralized server may be accessible to all hosts within the computing cluster. In another illustrative example, publishing the content identifier and the memory page identifier may include storing the content identifier in a shared memory region located on a virtual machine within the computing cluster. The shared memory region may be accessible to the one or more virtual machines within the computing cluster.

Memory comparison module 323 is responsible for comparing a first content identifier associated with a candidate memory page on a destination host computer system to the published content identifiers.

Transmission module 324 is responsible for transmitting memory pages from one or more hosts within the computing cluster to the destination host computer system. Transmission module 323 may also be responsible for transmitting one or more memory page identifiers and one or more content identifiers associated with memory pages among one or more hosts within the computing cluster.

Figure 4:
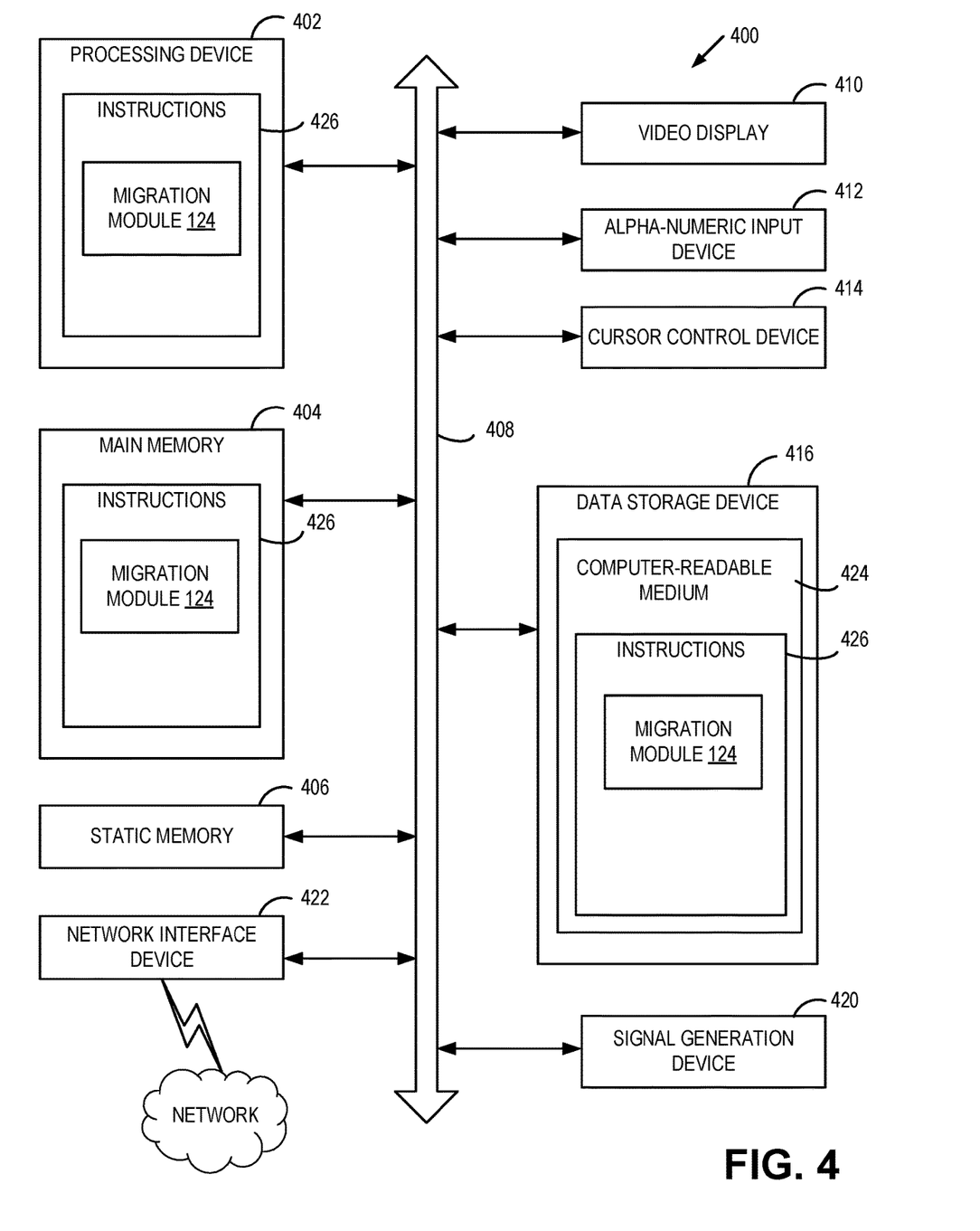
FIG. 4 is a block diagram that illustrates one implementation of a computer system in accordance with one or more aspects of the present disclosure.

FIG. 4 is a diagrammatic representation of a machine in the exemplary form of a computer system 400 within which a set of instructions for causing the machine to perform any one or more of the methodologies discussed herein may be executed. In various illustrative examples, computer system 400 may correspond to source host 101a and/or destination host 101b of FIG. 1. Computer system 400 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 400 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 400 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 400 may include a processing device 402, a main memory 404 (e.g., read-only memory (ROM), flash memory, dynamic random access memory (DRAM) (such as synchronous DRAM (SDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 402 may also be one or more special-purpose processing devices such as an application specific integrated circuit (ASIC), a field programmable gate array (FPGA), a digital signal processor (DSP), network processor, or the like. Processing device 402 may be configured to execute hypervisor 115 for programming the operations and steps discussed herein.

Computer system 400 may further include a network interface device 408. Computer system 400 may also include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., the hypervisor 115) embodying any one or more of the methodologies of functions described herein. The hypervisor 115 may also reside, completely or at least partially, within main memory 404 and/or within processing device 402 during execution thereof by computer system 400; main memory 404 and processing device 402 also constituting machine-readable storage media. Hypervisor 115 may further be transmitted or received over a network 426 via network interface device 408.

Machine-readable storage medium 420 may also be used to store the device queue manner logic persistently. While machine readable storage medium 420 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:
1. A method comprising:
publishing, by a first host computer system of a computing cluster comprising a plurality of host computer systems running a plurality of virtual machines, a list of memory page identifiers, wherein each memory page identifier is associated with a corresponding content identifier and a plurality of host identifiers, wherein each host identifier identifies a corresponding host computer system having one or more copies of memory pages referenced by the list of memory page identifiers;

receiving, from a second host computer system of the computing cluster, a memory page request comprising a first memory page identifier and a first content identifier;

comparing the first content identifier to a second content identifier comprised by a first memory page; and responsive to determining that the first content identifier matches the second content identifier, sending, to the first host computer system, the first memory page identified by the first memory page identifier.

2. The method of claim 1, wherein each content identifier reflects a value of a cryptographic hash function of a corresponding memory page.

3. The method of claim 1, wherein publishing the list of memory page identifiers further comprises:

identifying, by a kernel memory deduplication process running on the first host computer system, one or more memory pages that are shared by two or more virtual machines hosted by the first host computer system.

4. The method of claim 1, wherein publishing the list of memory page identifiers further comprises:

identifying, by a kernel memory deduplication process running on the first host computer system, one or more memory pages that are shared by at least one virtual machine hosted by the first host computer system and at least one virtual machine disk image.

5. The method of claim 1, wherein publishing the list of memory page identifiers further comprises:

sending the list of the memory page identifiers to a third host computer system of the computing cluster, wherein the third host computer system hosts a virtual machine that is being migrated to one or more computing systems of the computing cluster.

6. The method of claim 1, wherein publishing the list of memory page identifiers further comprises:

sending the list of the memory page identifiers to one or more computing systems of the computing cluster.

7. The method of claim 1, wherein sending the first memory page further comprises:

determining that the first content identifier matches the second content identifier.

8. A system, comprising:

a memory;

a processing device operatively coupled to the memory, the processing device configured to:

publish, by a first host computer system of a computing cluster comprising a plurality of host computer systems running a plurality of virtual machines, a list of memory page identifiers, wherein each memory page identifier is associated with a corresponding content identifier and a plurality of host identifiers, wherein each host identifier identifies a corresponding host computer system having one or more copies of memory pages referenced by the list of memory page identifiers;

receive, from a second host computer system of the computing cluster, a memory page request comprising a first memory page identifier and a first content identifier;

send, to a third host computer system of the computing cluster, the list of memory page identifiers;

compare the first content identifier to a second content identifier comprised by a first memory page; and responsive to determining that the first content identifier matches the second content identifier, send, to the first host computer system, the first memory page identified by the first memory page identifier.

9. The system of claim 8, wherein each content identifier reflects a value of a cryptographic hash function of a corresponding memory page.

10. The system of claim 8, wherein publishing the list of memory page identifiers further comprises:

identifying, by a kernel memory deduplication process running on the first host computer system, one or more memory pages that are shared by two or more virtual machines hosted by the first host computer system.

11. The system of claim 8, wherein publishing the list of memory page identifiers further comprises:

identifying, by a kernel memory deduplication process running on the first host computer system, one or more memory pages that are shared by at least one virtual machine hosted by the first host computer system and at least one virtual machine disk image.

12. The system of claim 8, wherein the third host computer system hosts a virtual machine that is being migrated to one or more computing systems of the computing cluster.

13. The system of claim 8, wherein publishing the list of memory page identifiers further comprises:

sending the list of the memory page identifiers to one or more computing systems of the computing cluster.

14. The system of claim 8, wherein sending the first memory page further comprises:

determining that the first content identifier matches the second content identifier.

15. A non-transitory machine-readable storage medium storing instructions that cause a processing device to:

publish, by a first host computer system of a computing cluster comprising a plurality of host computer systems running a plurality of virtual machines, a list of memory page identifiers, wherein each memory page identifier is associated with a corresponding content identifier and a plurality of host identifiers, wherein each host identifier identifies a corresponding host computer system having one or more copies of memory pages referenced by the list of memory page identifiers;

receive, from a second host computer system of the computing cluster, a memory page request comprising a first memory page identifier and a first content identifier;

compare the first content identifier to a second content identifier comprised by a first memory page; and responsive to determining that the first content identifier matches the second content identifier, send, to the first host computer system, the first memory page identified by the first memory page identifier.

16. The non-transitory machine-readable storage medium of claim 15, wherein each content identifier reflects a value of a cryptographic hash function of a corresponding memory page.

17. The non-transitory machine-readable storage medium of claim 15, wherein publishing the list of memory page identifiers further comprises:

identifying, by a kernel memory deduplication process running on the first host computer system, one or more memory pages that are shared by two or more virtual machines hosted by the first host computer system.

18. The non-transitory machine-readable storage medium of claim 15, wherein publishing the list of memory page identifiers further comprises:

identifying, by a kernel memory deduplication process running on the first host computer system, one or more memory pages that are shared by at least one virtual machine hosted by the first host computer system and at least one virtual machine disk image.

19. The non-transitory machine-readable storage medium of claim 15, wherein publishing the list of memory page identifiers further comprises:
  sending the list of the memory page identifiers to a third host computer system of the computing cluster, wherein the third host computer system hosts a virtual machine that is being migrated to one or more computing systems of the computing cluster.

20. The non-transitory machine-readable storage medium of claim 15, wherein sending the first memory page further comprises:
  determining that the first content identifier matches the second content identifier.

* * * * *